Patented July 10, 1928.

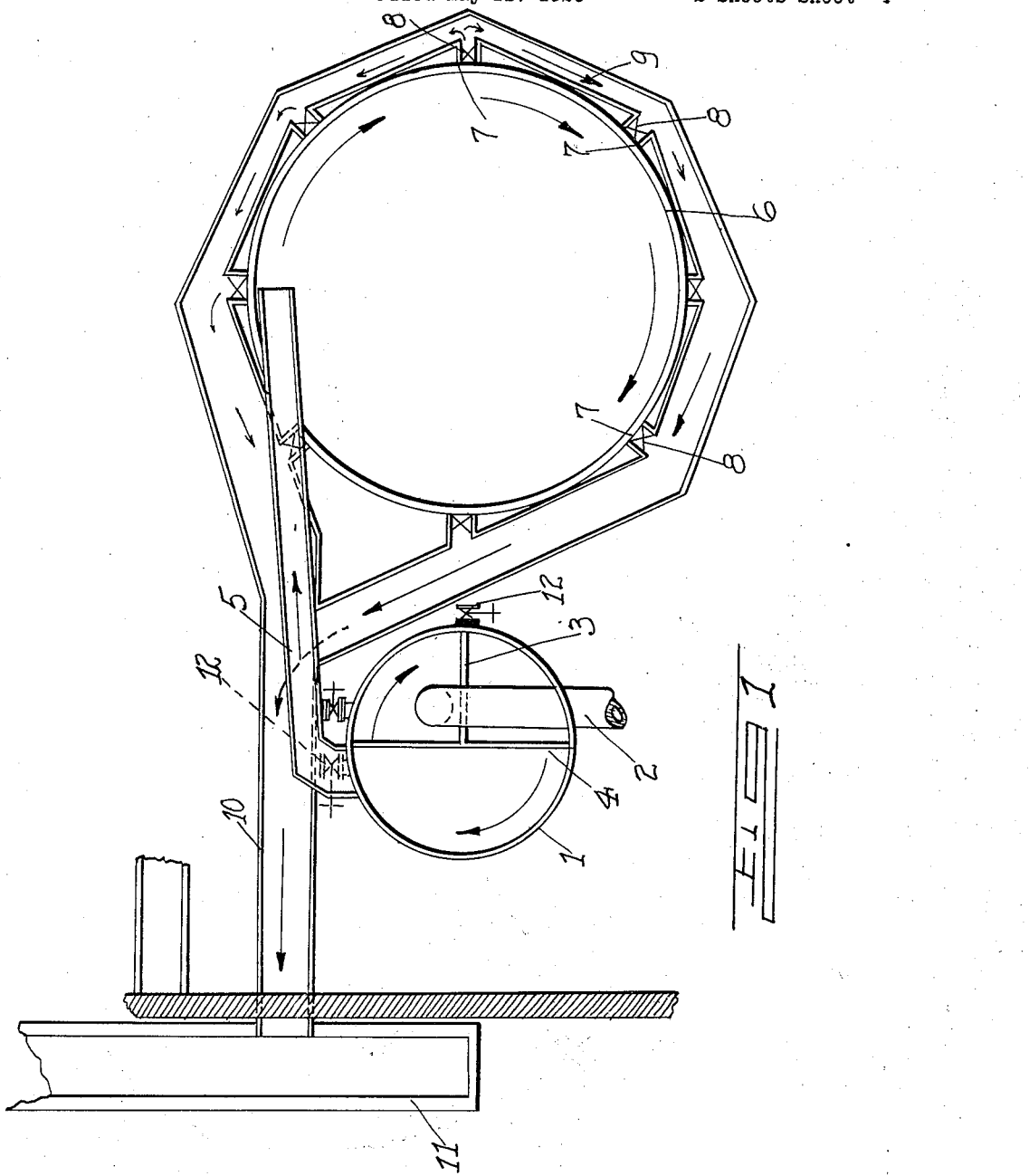

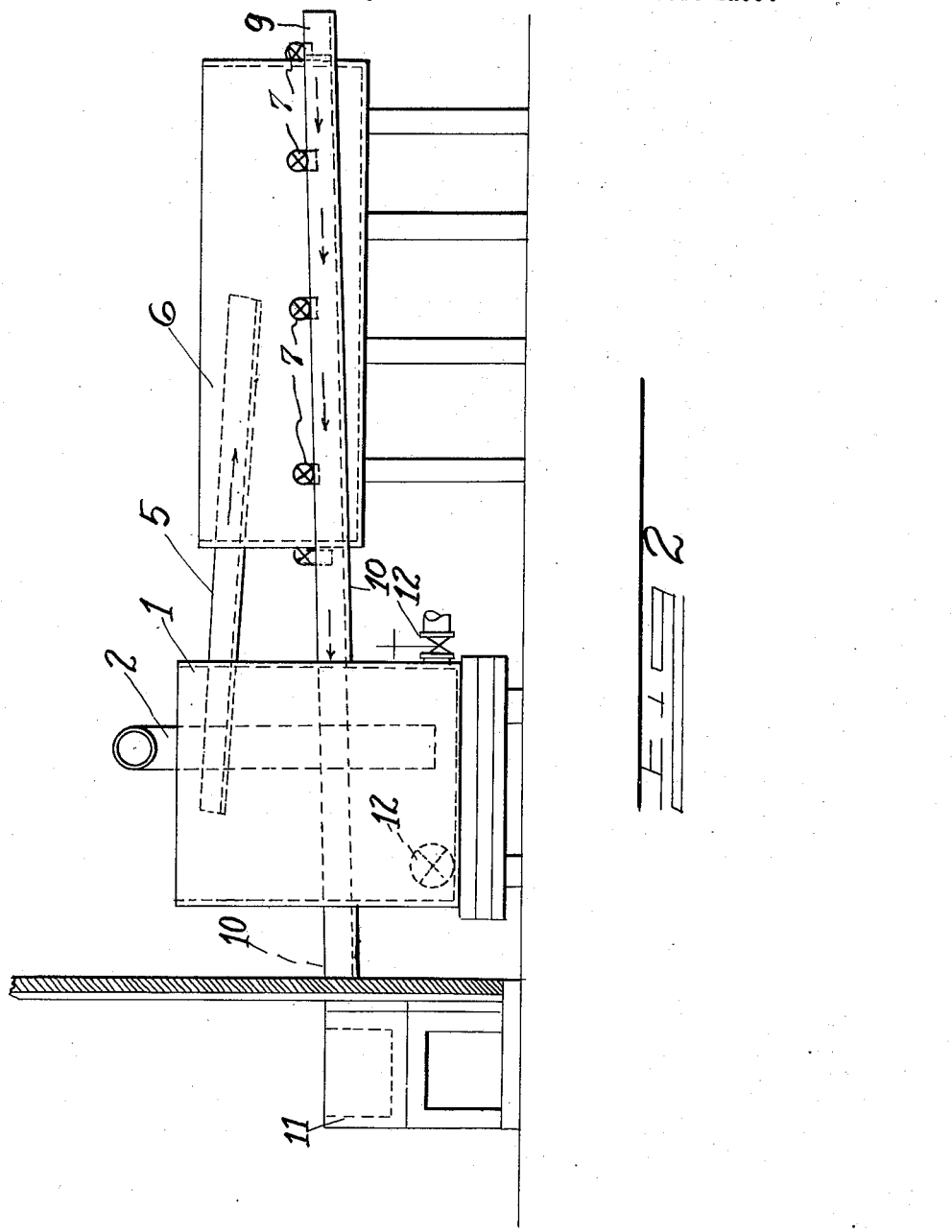

1,676,652

UNITED STATES PATENT OFFICE.

CHARLES L. KELLER, OF GLENDALE, OHIO, ASSIGNOR TO THE RICHARDSON COMPANY, OF LOCKLAND, OHIO, A CORPORATION OF OHIO.

APPARATUS AND PROCESS FOR CLEANING PAPER STOCK.

Application filed May 11, 1926. Serial No. 108,381.

My invention relates specifically to novel apparatus and process which may be advantageously employed in what may be termed a secondary step in the process of pulping paper stock.

It is the object of my invention to provide apparatus with which pulped paper stock may be effectively cleaned of impurities which are either heavier or lighter than the paper stock being processed.

In the process of making paper, the steps which have been used in the past have consisted in the beating of the raw paper stock in a beater and the discharging of the pulped beater stock to a settling tank in which impurities which arose to the top were skimmed off, and impurities which settled to the bottom were flushed out during an interval when the tank was otherwise empty. My improvements are directed toward the provision of apparatus which will enable more effective cleaning of the stock in the second step of the process, subsequent to the beating, and prior to the thickening of the pulp.

In the manufacture of paper stock from old newspaper and other forms of scrap paper, the impurities which are ordinarily present in the paper stock lead to many manufacturing difficulties. The impurities which are present, which are lighter than the paper stock, consist principally in corks or match sticks, and the impurities which are heavier than the paper stock, consist of wire clips and small pieces of metal.

While it has been customary to separate out matter which is heavier than the pulp by settling, and matter which is lighter than the paper stock by flotation, apparatus with which this could be carried out has been difficult to build due to the tremendous bulk of liquor which is handled.

My improved apparatus, while it must have sufficient capacity to accommodate a great volume of liquor has several novel features which are instrumental in readily floating the impurities during the flotation purification step.

Referring to the drawings in which I have illustrated apparatus embodying my invention:

Figure 1 is a plan view of the tanks in which the purification by settling and flotation may be accomplished.

Figure 2 is a side elevation of the apparatus shown in Figure 1.

Generally indicated at 1, I have shown the tank in which the separation by settling may be accomplished. The tank which may be of any desired size has discharging into it a conduit 2, through which the beater pulp stock is conveyed. A baffle 3, within the tank 1 forces the pulped liquor to pass up, over the top of the baffle, the sides and bottom of the baffle being jointed to the walls and bottom of the tank. After passing up over the baffle 3, the pulped liquor is then forced down under a baffle 4, which has an orifice adjacent the bottom. The object of the second baffle is more to cause the liquor to rise to the top of the tank in its course just prior to its discharge from the tank, although the compartment outlined between the baffles 3 and 4 will catch some of the flotant matter.

From the tank 1, at the high level of liquor within the tank, a sluice way or conduit 5 is extended to my flotation separating tank 6, which is preferably of great width and not very great depth in comparison as I have found that the surest way to secure a perfect separation of flotant matter is to prevent any direct current between inlet and outlet ports of the tank by establishing a current or eddy within the flotation separating tank which moves counter to the line of flow from inlet to outlet which will gently carry the lighter-than-pulp-liquor material to the top of the tank from which it may be skimmed off. The skimming tank is provided with bottom discharge ports 7, under control of valves indicated diagrammatically at 8. These valves discharge into a surrounding sluice way 9, having a discharge connection 10 by which the cleaned pulped stock is conveyed to a trough such as is indicated at 11, from which it is discharged into apparatus for thickening the pulp.

By the use of my novel apparatus, I am able to manufacture pulp board, which is entirely free from blemishes which occasionally occurred due to the presence of corks, match sticks or pieces of metal.

In order to control the flotation separating tank, the valves which are mounted in interspaced position about the tank and which control the discharges into the sluice way 9 are kept closed until the skimming tank 6 is approximately filled, at which stage the valves are sufficiently opened to keep the tank at a desired level. In order to clean out the sediment tank 1, valves as indicated diagrammatically at 12 are disposed at the bottom of the tank so that sedimentary impurities may be flushed out at some convient time when the tank is not in operation.

Modifications in structure will occur to those skilled in the art, but in so far as changes which may be made, provide a tank for separation by sedimentation and a skimming tank having a sluice way so arranged as to provide an eddy current with interspaced discharge lines to mitigate the tendency of any appreciable discharging current, I consider such modifications within the scope of my invention.

Having thus described my invention what I claim as new and desire to secure by Letters Patent is:

1. Apparatus for cleaning pulped paper stock consisting of a sedimentation tank and a skimming tank arranged in series, said sedimentation tank having a baffle therein over which the liquor flowing through said tank must pass, and said skimming tank having a conduit extended from the top of the liquor level in said sedimentation tank, said conduit extending tangentially through the side of said skimming tank.

2. Apparatus for cleaning pulped paper stock consisting of a sedimentation tank and a skimming tank arranged in series, said sedimentation tank having a baffle therein over which the liquor flowing through said tank must pass, and said skimming tank having a conduit extended from the top of the liquor level in said sedimentation tank, said conduit extending tangentially through the side of said skimming tank, and a bottom discharging control for said skimming tank.

3. Apparatus for cleaning pulped paper stock consisting of a sedimentation tank and a skimming tank arranged in series, said sedimentation tank having a baffle therein over which the liquor flowing through said tank must pass, and said skimming tank having a conduit extended from the top of the liquor level in said sedimentation tank, said conduit extending tangentially through the side of said skimming tank, and a bottom discharging control for said skimming tank, said bottom discharging control consisting of a series of interspaced valves arranged adjacent the bottom in the walls of the skimming tank.

4. Apparatus for cleaning pulped paper stock comprising a sedimentation tank having a discharge sluice way and a flotation tank in which material lighter than the pulped paper stock will rise to the surface, and said sluice way extending in approximately a horizontal direction into said flotation tank, whereby an eddy current may be established in said tank, to carry lighter-than-liquor impurities to the surface thereof.

5. Apparatus for cleaning pulped paper stock comprising a sedimentation tank having a discharge sluice way and a flotation tank in which material lighter than the pulped paper stock will rise to the surface, and said sluice way extending in approximately a horizontal direction into said flotation tank whereby an eddy current may be established in said tank, to carry lighter than liquor impurities to the surface thereof, a bottom discharge in said flotation tank and means of regulating the quantity discharged through whereby a constant level in said tank may be maintained.

6. That process of separating lighter than liquor impurities from pulped paper stock which consists in conveying said stock through a sluice way into a tank, establishing eddy currents within said tank and controlling the discharge from said tank to evenly control the discharge in interspaced positions located about the entire periphery of said tank, and maintain a level of liquor within the tank at approximately the level of the sluiceway.

7. That process of cleaning pulped paper stock which consists in conveying the liquor to a sedimentation tank, baffling the liquor within the tank, sluicing the liquor to a skimming tank, introducing the liquor into said skimming tank at a tangent to the walls thereof, forming an eddy current, and discharging the cleaned liquor from a bottom discharge in such a regulated quantity as to maintain a constant level of liquor within said tank at approximately the level of the sluice way.

CHARLES L. KELLER.